Figure 1:
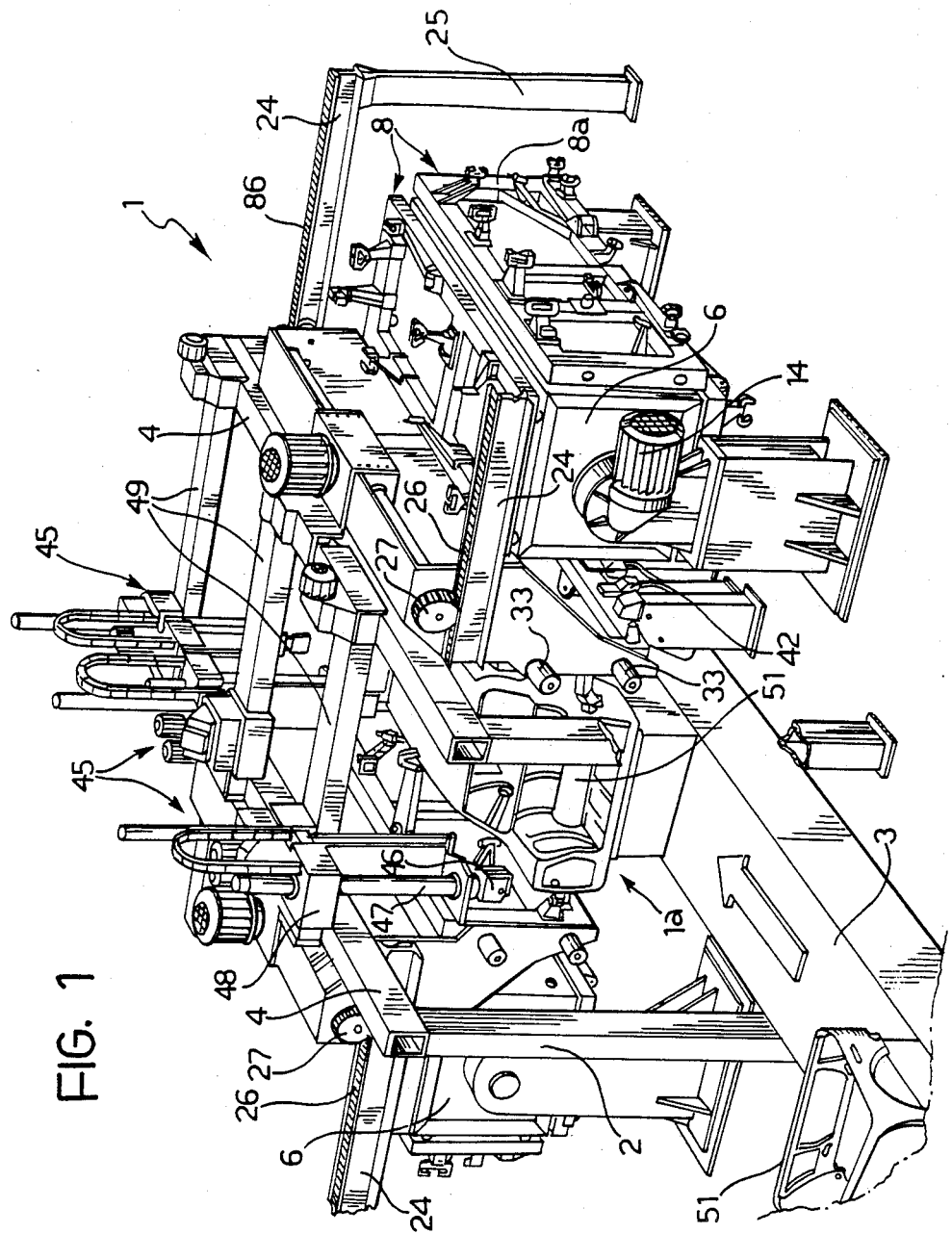

United States Patent [19]

Alborante et al.

[11] Patent Number: 4,905,884
[45] Date of Patent: Mar. 6, 1990

[54] APPARATUS FOR WELDING MOTOR VEHICLE BODIES

[75] Inventors: Giancarlo Alborante, Trofarello; Rinaldo Graciotti, Buttigliera, both of Italy

[73] Assignee: Comau S.p.A., Turin, Italy

[21] Appl. No.: 370,225

[22] Filed: Jun. 22, 1989

[30] Foreign Application Priority Data

Jul. 13, 1988 [IT] Italy ................................ 67661-A/88

[51] Int. Cl.⁴ .............................................. B23K 37/04
[52] U.S. Cl. .................... 228/4.1; 228/44.3; 228/47; 219/79; 219/158; 29/50
[58] Field of Search ................. 228/44.3, 47, 5.1, 4.1; 219/79, 80, 86.24, 158; 29/795, 50

[56] References Cited

U.S. PATENT DOCUMENTS

| | | | |
|---|---|---|---|
| 4,256,947 | 3/1981 | De Candia | 219/79 |
| 4,659,895 | 4/1987 | Di Rosa | 228/4.1 |
| 4,767,046 | 8/1988 | Kumagai et al. | 228/41 |
| 4,802,616 | 2/1989 | Naruse | 228/47 |

Primary Examiner—Nicholas P. Godici
Assistant Examiner—Samuel M. Heinrich
Attorney, Agent, or Firm—Pennie & Edmonds

[57] ABSTRACT

Apparatus for welding motor vehicle bodies which have previously been assembled loosely comprises a station for the forming and welding of the body, a conveyor line for transporting the loosely preassembled bodies to the station, at least two pairs of forming frames situated at the two sides of the station, each pair of forming frames being provided with positioning devices engageable with the body and adapted to the specific geometric shape of particular type of body, forming-frame conveyor means for bringing a pair of forming frames corresponding to the type of body which is in the welding station into correspondence with an operative position in the welding station from time to time, and at least one welding device for welding the body. At least one drum which can rotate about an axis parallel to the length of the welding station and carries on its periphery a plurality of forming frames suitable for various types of body is provided on each side of the conveyor line.

8 Claims, 10 Drawing Sheets

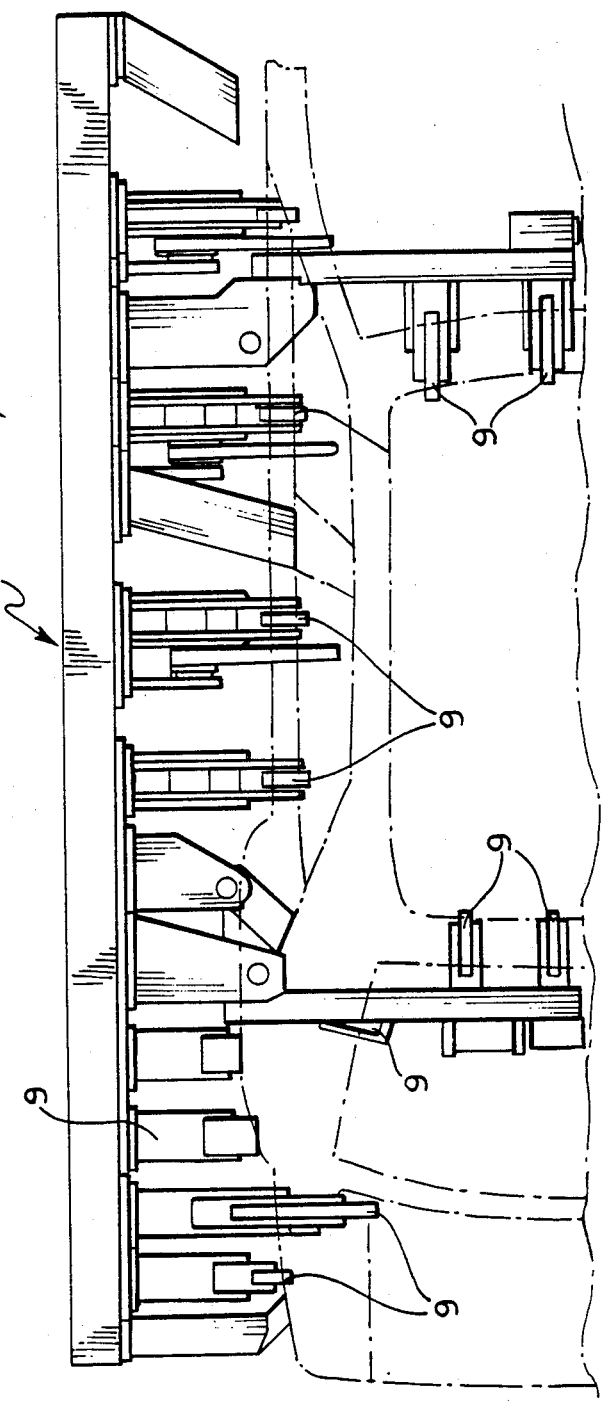

APPARATUS FOR WELDING MOTOR VEHICLE BODIES

DESCRIPTION

The present invention relates to apparatus for welding motor vehicle bodies which have previously been assembled loosely, of the type comprising:

a station for the forming and welding of the body, a conveyor line for transporting the loosely preassembled bodies through the station, at least two pairs of forming frames situated at the two sides of the station, each pair of forming frames being provided with positioning devices engageable with the body and adapted to the specific geometric shape of a particular type of body, forming-frame conveyor means for bringing a pair of forming frames corresponding to the type of body which is in the welding station into correspondence with a position in the welding station from time to time, and at least one welding device for effecting the welding of the body in the forming and welding position.

Apparatus of the type indicated above is described and illustrated in the same Applicant's German Pat. No. 2,810,822 and in the corresponding U.S. Pat. No. 4,162,387.

The object of the present invention is to produce apparatus of the type specified above, which is able to operate on a relatively large number of different body types and which at the same time occupies a reduced space longitudinally of the welding station.

In order to achieve this object, the subject of the invention is apparatus of the type indicated at the beginning of the present description, characterised in that at least one drum member rotatable about an axis parallel to the longitudinal direction of transport of the bodies through the welding station and carrying on its periphery a plurality of forming frames suitable for different types of body is provided on each side of the conveyor line.

In a preferred embodiment, the two drum members are arranged at the two sides of the working position in the welding station and means are provided for taking the forming frame which faces the working position from each drum member and moving it transverse the longitudinal direction of the welding station to an operative position in which the forming members of the frame engage the body which is in the working position, and, conversely, for returning the forming frame from the operative position to its coupled position on the rotary drum.

When a body arrives at the welding station, a corresponding pair of forming frames is brought into the operative position in which the respective forming devices engage the various parts of the body to clamp them in their correct positions of assembly, whilst the welding devices effect a sufficient number of electrical spot welds to provide the structure with a stable configuration. Upon the completion of the welding, the body is discharged from the welding station and replaced by a new body to be welded. If the body entering the welding station is of a different type from that welded before, the forming frames previously used in the working position are returned to the respective rotary drums and the latter are rotated so as to bring the two forming frames which correspond to the new type of body to be welded into positions facing the working position. When the rotation has been carried out, the two forming frames to be used are moved transversely away from their positions on the rotary drums, until they are brought into engagement with the body to be welded.

Moreover, in the preferred embodiment, each forming frame also carries a plurality of welding guns whose electrodes are connected to terminal contacts provided on the forming frame. Fixed electrical supply means for the welding guns are provided in correspondence with the working position in the welding station, and include a pair of contacts which can engage the terminal contacts carried by the forming frame when the latter is in its operative position. Preferably, the welding station is also provided with welding robots suspended in raised positions above the working position of the welding station.

Figure 2:
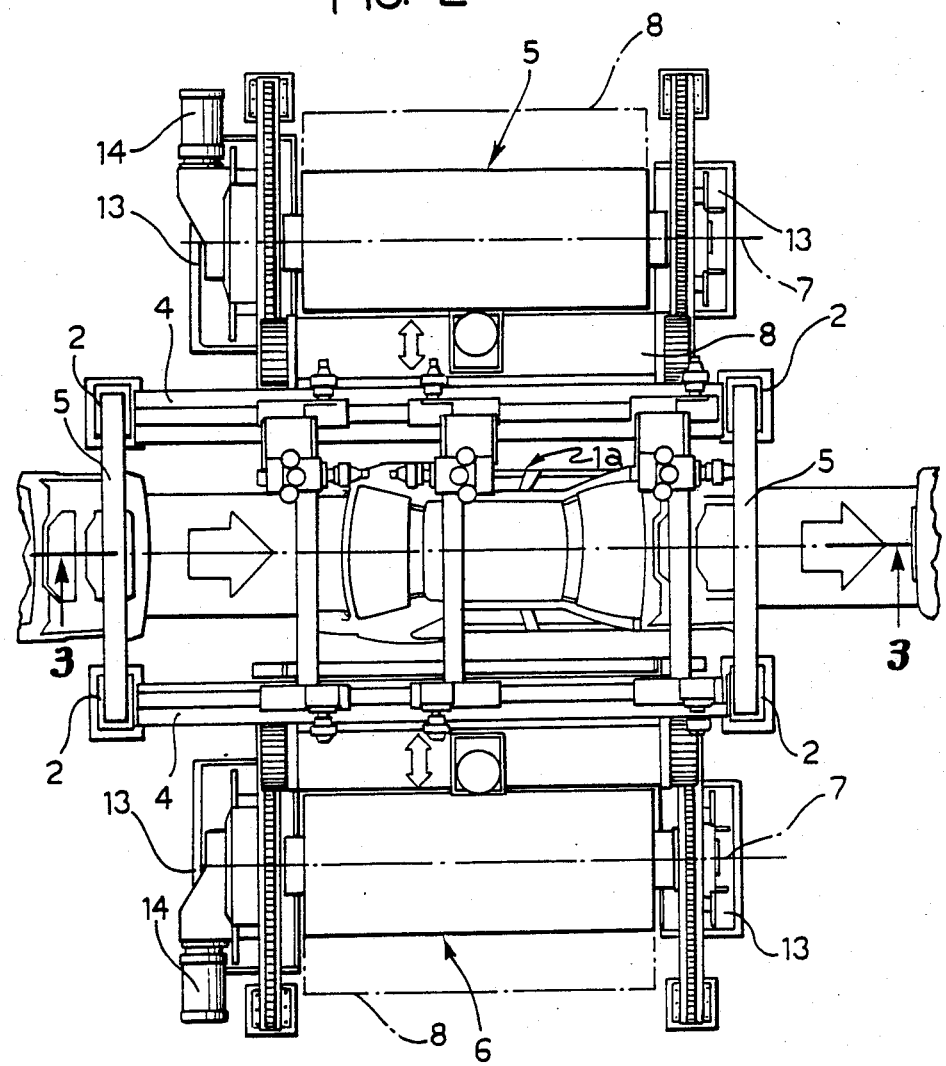
Figure 3:
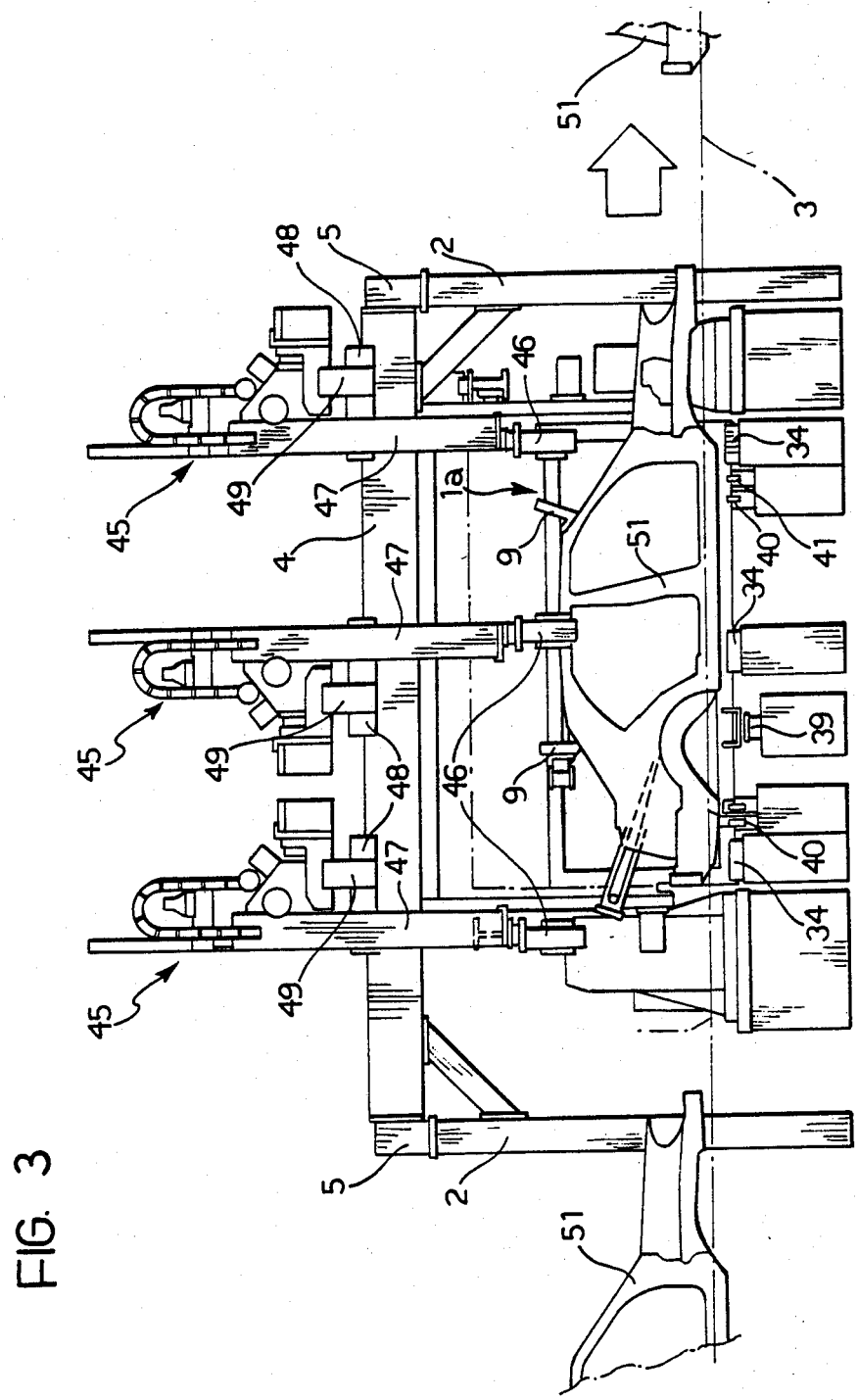
Figure 4:
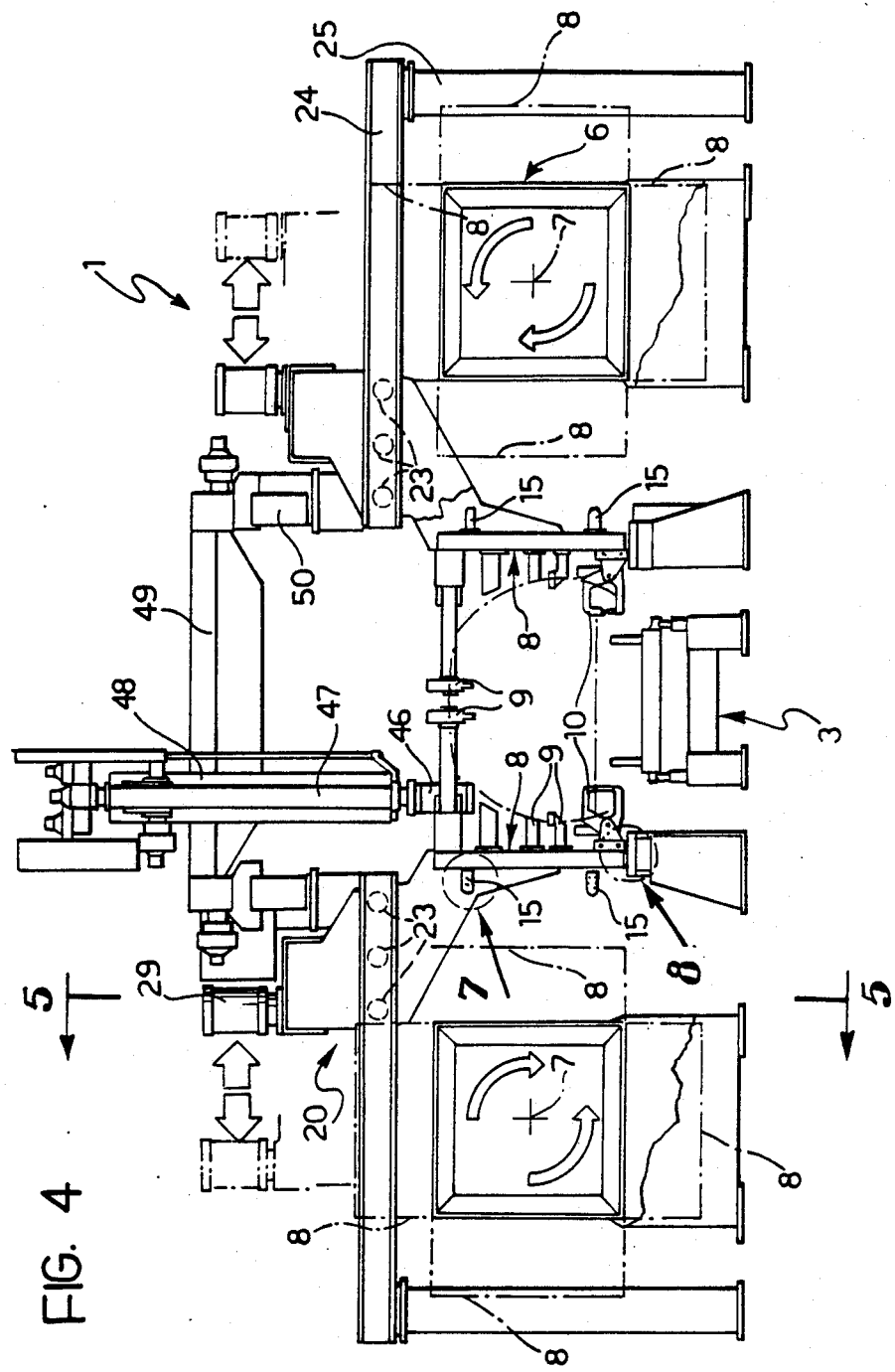
Figure 5:
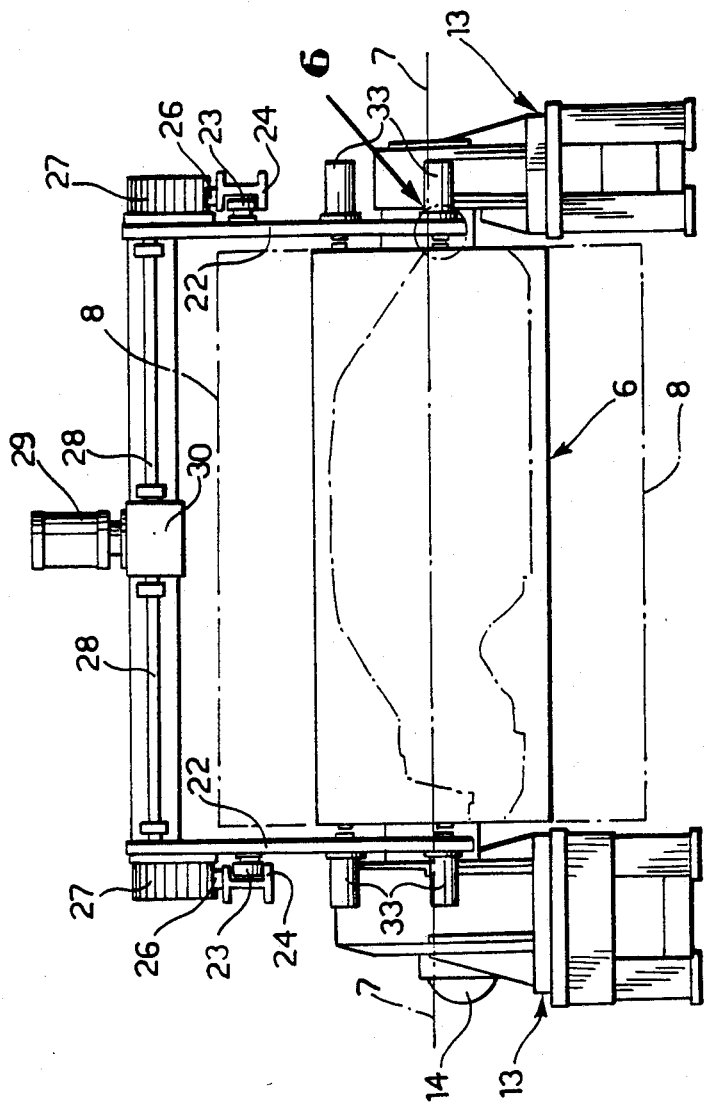
Figure 7:
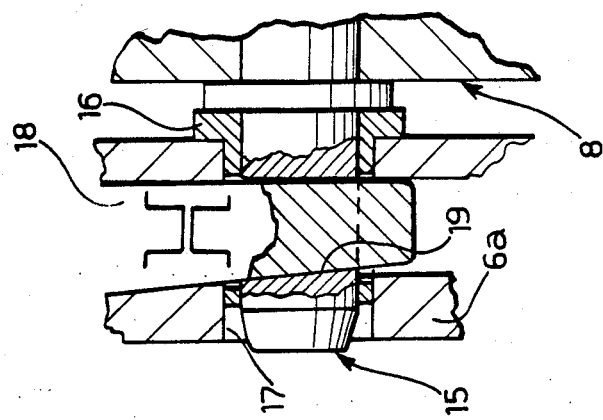
Figure 6:
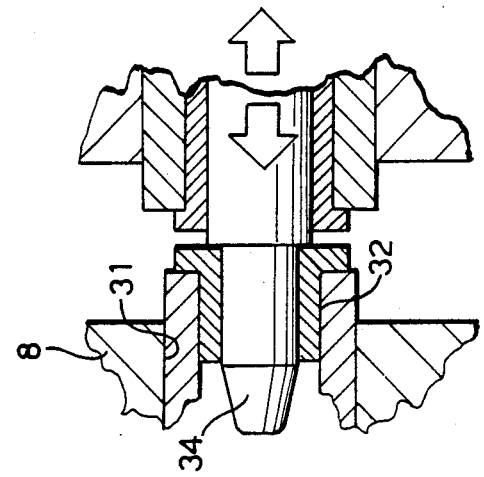
Figure 9:
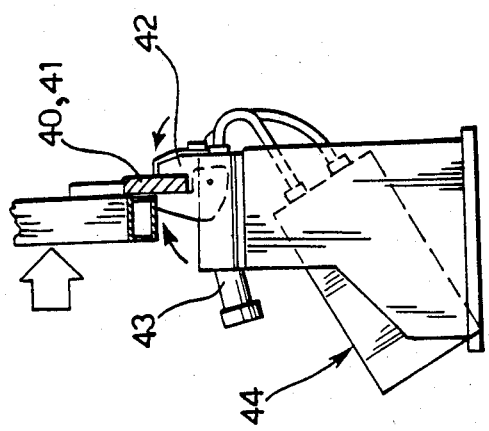
Figure 8:
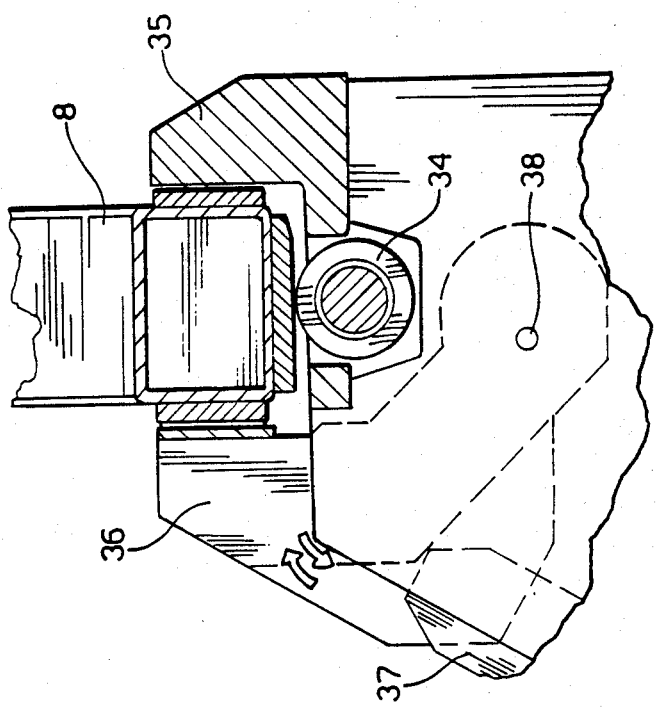
Figure 13:
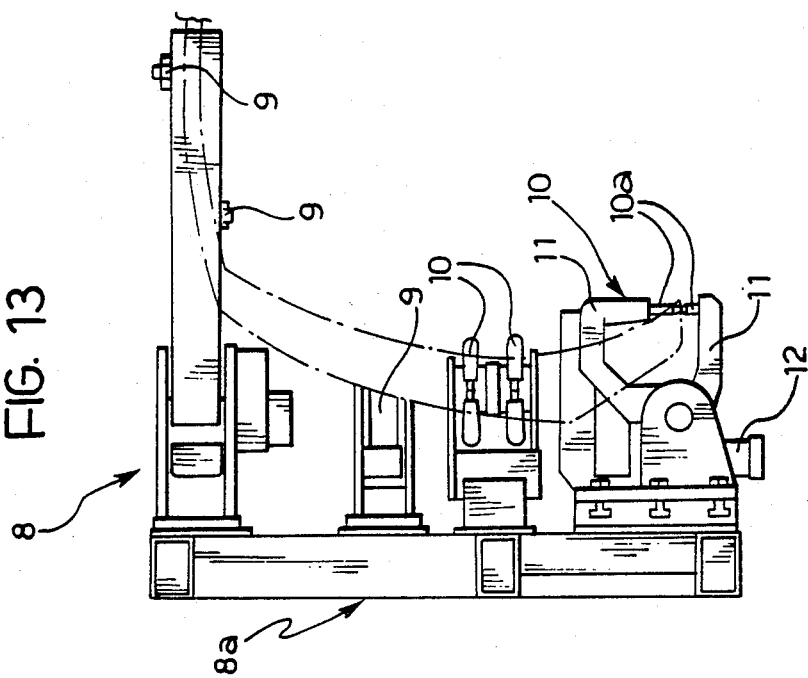
Figure 10:
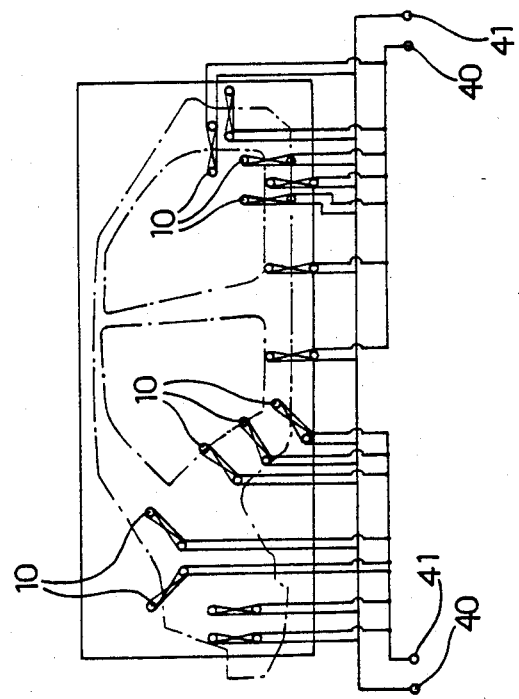
Figure 11:
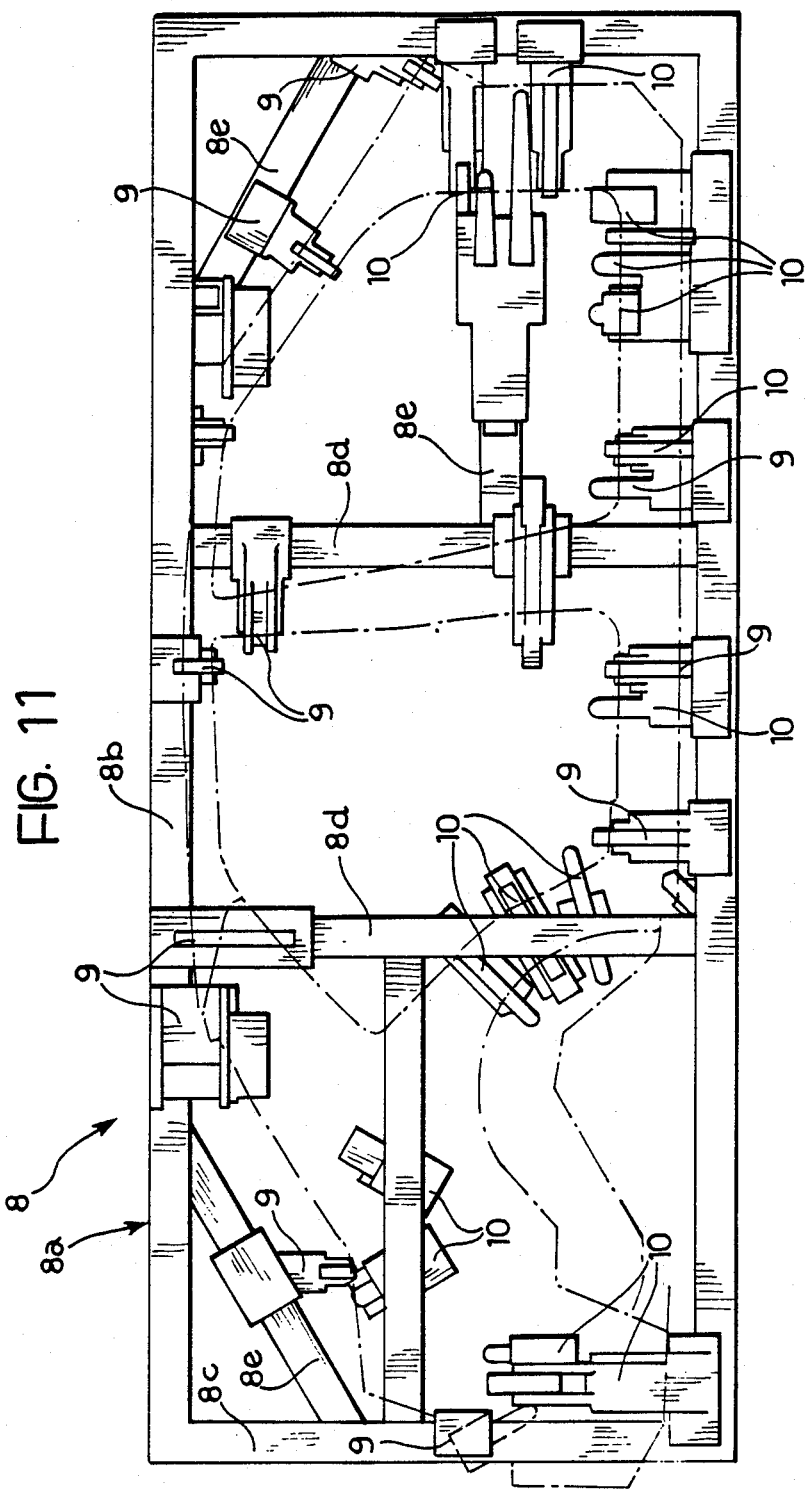

Further characteristics and advantages of the invention will become clear from the description which follows with reference to the appended drawings, in which:

FIG. 1 is a schematic perspective view of welding apparatus according to the invention, FIG. 2 is a schematic plan view of the apparatus of FIG. 1, FIG. 3 is a section taken on the line III—III of FIG. 2, FIG. 4 is a section taken on the line IV—IV of FIG. 2, FIG. 5 is a section taken on the line V—V of FIG. 4, FIG. 6 is a section of the detail indicated by the arrow VI in FIG. 5, on an enlarged scale, FIG. 7 is a section of the detail indicated by the arrow VII of FIG. 4, on an enlarged scale, FIG. 8 is a section of the detail indicated by the arrow VIII of FIG. 4, on an enlarged scale, FIG. 9 is a view of the detail indicated by the arrow IX of FIG. 3, on an enlarged scale, FIG. 10 is a schematic view of the electrical supply system of the welding guns situated on a forming frame, and FIGS. 11, 12 and 13 are a schematic side view, a schematic plan view and a schematic front view of a forming frame engaged with a motor vehicle body.

In FIGS. 1 to 4, a forming and welding station according to the present invention is generally indicated 1. The station 1 comprises a fixed structure which, in the embodiment illustrated, includes two pairs of columns 2 situated at the two sides of a conveyor line 3 for transporting the bodies. Each pair of columns 2 arranged on one side of the conveyor line 3 is connected at the top by a longitudinal beam 4. The fixed structure is completed by two cross members 5 situated in correspondence with the ends of the longitudinal beams 4 and connecting the upper ends of the columns 2 which are situated on the two sides of the conveyor line 3.

The central region within the fixed structure described constitutes the working position of the station, in correspondence with which the bodies to be welded are stopped in order to undergo the necessary welding operations.

According to the prior art of the same Applicant's German Pat. No. 2,810,822, the bodies are first loosely assembled and then brought to the welding station 1. The loose preassembly can be carried out, for example, by coupling the various sub-units of the body by means of the bending of tongue-like appendages ("toy tabs" in English terminology) on to adjacent parts of the body.

Still according to the prior art described above, the station 1 provides for the positioning of the various parts of the body in the correct assembly position and the effecting of a sufficient number of spot welds to provide the structure with stability. The conveyor line 3 used for bringing the loosely preassembled bodies into the welding station and for carrying the welded bodies away from the welding station and to the subsequent stations (not illustrated) which complete the welding of the body is shown only schematically in the appended drawings. The details of the structure of the line 3 are not illustrated since this structure is of known type and does not fall within the scope of the present invention. Moreover, it is clear that, while the appended drawings illustrate schematically a transfer line which passes through the welding station, any alternative solution may be used for transporting the preassembled bodies into the welding station and for transporting the welded bodies away from the welding station. Various possible solutions in this connection are described, for example, in the cited German Pat. No. 2,810,822.

Again according to the prior art of the above patent, the welding station is provided with a plurality of pairs of forming frames which are rapidly interchangeable in the operative position and each of which carries a series of positioning devices intended to position the body correctly for the execution of the welding operations. The positioning devices of each pair of forming frames are adapted to a specific type of body. The present invention particularly concerns a specific technique which can be used to achieve the rapid replacement of the pair of forming frames situated in the operative position in order to enable the welding of different body types.

In the device according to the invention, the different types of forming frames are arranged on each side of the line 3 on the periphery of a drum 6 which is mounted for rotation about an axis 7 parallel to the length of the body situated in the welding station.

In the preferred embodiment illustrated in the drawings, the two rotary drums 6 face the working position 1a in the welding station.

In the embodiment illustrated, each rotary drum 6 has four faces each carrying a forming frame 8 of a respective type. Each forming frame 8 comprises, in known manner, a substantially frame-like support structure 8a (FIGS. 11, 12, 13) having its longer sides 8b directed longitudinally and two intermediate cross members 8d parallel to the shorter sides 8c. Naturally, the particular structure of the frame 8 which is illustrated in the appended drawings is given only by way of example. Positioning and clamping devices 9 are fixed to the support structure 8a. The structure of the devices 9 is not shown in detail since it is of known type and does not fall within the scope of the present invention. The purpose of the clamping devices 9 is to position the various parts of the loosely preassembled body correctly and to clamp them in that position during the welding. The arrangement and shape of the devices 9 depend on the geometric shape of the body to be welded. In the preferred embodiment illustrated, each forming frame 8 is also provided with a series of welding guns 10 for the electrical spot welding of the body (FIGS. 11, 12, 13), each welding gun 10 comprising two electrodes 10a (FIG. 13) carried by the jaws of the gun and being provided with an actuator cylinder 12 for operating its jaws. The means for the electrical supply of the electrodes of the welding guns and for the supply of fluid to the actuator cylinders of the guns will be described in detail below.

Each drum 6 is supported for rotation about the axis 7 by two columns 13, one of which has an associated electric operating motor 14 with a reduction device. The electric motor 14 is operated to rotate the rotary drum 6 and position the forming frame 8 corresponding to the type of body to be welded so that it faces the working position. Once this positioning has been effected, the forming frame to be used is removed (in the manner which will be described in detail below) from the rotary drum and brought adjacent the body to be welded so as to enable the clamping devices 9 and the welding devices 10 to engage the body.

FIG. 4 shows the welding station in the condition in which two forming frames have been removed from the rotary drums 6 and brought into engagement with a body to be welded. Each forming frame is provided, on its face which faces the rotary drum, with a plurality of coupling pins 15 which enable the frame 8 to be coupled to the rotary drum 6. As shown in detail in FIG. 7, when a forming frame 8 is situated in contact with the respective face of the rotary drum 6, each of the pins 15 is housed in a bush 16 mounted in a through-hole 17 formed in the wall 6a of the rotary drum. The clamping of the forming frame 8 to the rotary drum 6 is achieved by the engagement of a wedge 18, driven by an actuator cylinder (not visible in the drawings) mounted within the rotary drum 6, in a transverse hole 19 in each coupling pin 16 (see FIG. 7).

In the appended drawings, only the forming frames 8 which are situated in the operative position in correspondence with the working position of the welding station are shown in detail, while the rest of the forming frames situated on the rotary drum are shown schematically in broken outline.

A slide device 20 is provided on each side of the welding station for moving the forming frame 8 which faces the working position between the position in which it is coupled to the rotary drum 6 and its operative position adjacent the body to be welded. Each device 20 has a portal structure with an upper cross member 21 and two lateral legs 22 (FIG. 5). The legs 22 are provided with wheels 23 (FIGS. 4, 5) which engage two lateral tracks defined by two I-sections 24 supported at their ends by the side members 4 and by columns 25 (FIGS. 1, 4).

The upper faces of the two sections 24 carry two racks 26 on which roll two ring gears 27 supported for rotation by the structure 20 and rotated, through shafts 28 arranged on a common axis along the cross member 21, by a central electric motor 29 and a reduction device 30 with two outputs (FIG. 5). The operation of the motor 29 causes the rotation of the toothed columns 27 and the consequent movement of the structure 20 with the motor 29 and its transmission in a direction transverse the longitudinal direction of the welding station. In order to enable the coupling of a forming frame 8 to the device 20, the two vertical sides of each frame 8 have a pair of vertically spaced holes 31 (FIG. 6), each of which has a bush 32 associated therewith. Each of the two legs 22 of the structure 20 has a pair of actuator cylinders 33 which cause the insertion of coupling pins 34 (FIG. 6) into the bushes 32 and the consequent coupling of the frame 8 to the device 20. On the assumption that the forming frame 8 which faces the working position of the welding station is situated in the position in which it is coupled to the respective rotary frame 6, it is picked up by the device 20 firstly by the positioning of the device 20 in correspondence with the frame 8 to cause the engagement of the pins 34 in the bushes 32 of the frame 8 by the operation of the actuator cylinders 33, and then by the disengagement of the wedges 18 from the coupling pins 15 which lock the frame 8 to the rotary drum. Once the frame 8 has been loaded onto the device 20, the latter can be moved transversely by the operation of the motor 29 until the frame 8 is brought to the operative position (FIG. 4) in which the clamping tools 9 and the welding guns 10 can engage the body to be welded. When the frame 8 reaches its operative position, its lower edge rises on rollers 34 with horizontal axes (FIG. 3, FIG. 8) which ensure the accuracy of the vertical positioning of the frame. At the same time, the accuracy of the horizontal positioning of the frame 8 is ensured by the engagement of the lower arm of the frame against a support wall 35 and by its clamping against this wall by means of a lever 36 (FIG. 8) which is operated by an actuator cylinder 37 and is pivotable about an axis 38. When the lever 36 is in the operative position illustrated in FIG. 8, it comes into engagement with the frame 8 on the side opposite that which is in contact with the support wall 35 so as to clamp the frame against the latter.

When the frame 8 is in its operative position, the pipes for the supply of fluid to the actuator cylinders of the welding guns, which are situated in the hollow structure of the frame 8, are put into communication with a fluid-supply source by means of a quick-coupling connector 39 which is raised automatically until it mates with a corresponding part provided in the forming frame 8. The details of this connector are not illustrated since they are of known type. In the embodiment illustrated, the electrical supply of the welding guns 10 is achieved (FIG. 10) by means of two separate electrical circuits which are connected to two pairs of terminals 40, 41 (FIG. 10, FIG. 3) provided in the lower part of the frame 8. Each of the terminals 40, 41 is engaged—when the frame 8 is in its operative position—by a clamp 42 operated by an actuator cylinder 43 (FIG. 9), the two clamps 42 associated with each pair of terminals 40, 41 being connected in turn to the two terminals of an electrical supply transformer 44 (FIG. 9). All the welding guns of each electrical circuit are therefore supplied by the same fixed electrical transformer.

Finally, three cartesian robots are provided in the upper part of the welding station and carry the same number of welding guns which cooperate with the welding guns carried by the forming frames 8 in the operative position so as to carry out the welding of the body which is in the station. Each of the robots—generally indicated 45—has a head 46 carried by a slide 47 which can slide vertically relative to a further slide 48 which slides horizontally on a bridge 49 whose ends are mounted for sliding on two tracks 50 provided on the side members 4 of the welding station (FIGS. 1, 4). Each of the three axes of the robot is controlled by a respective electric operating motor. The structure of the robots is not described in detail, however, since it is of known type.

The operation of the system described above is as follows:

the conveyor line 3 brings successive bodies 51 to be welded to the working position in the welding station 1 with a stepwise movement. As already indicated, the bodies arrive at the welding station in a loosely preassembled condition. When a new body 51 arrives and stops in the welding station, the rotary drums 6 are already arranged with the forming frames of the type corresponding to the type of body to be welded in position facing the working position 1a. If the frame 8 is still attached to the rotary drum 6, the device 20 provided on each side of the station picks up the frame in the manner described above and places it in the operative position. In this position, the various clamping devices engage the body to position its various elements accurately after which the welding guns 10 carried by the forming frames 8 and the welding guns 46 carried by the robots 45 come into operation to effect the welding of the body. When the welding is completed, the clamping devices 9 open (as do the clamping levers 36) and the devices 20 retract the frames to enable the discharge of the welded body from the welding station and the entry of a new body to be welded. If the body arriving at the station is of the same type as that welded previously, the structures 20 do not return the frames 8 to the rotary drums but leave them in an intermediate waiting position and then, once the new body to be welded has reached the station, return them to the operative position. If the new body to be welded is of a different type from that welded previously, the forming frames 8 used previously are placed on the respective rotary drums and the latter are rotated until two forming frames which correspond to the new type of body to be welded are brought into position facing the working position. The devices 20 take the two frames 8 from the rotary drums and place them in the operative position as soon as the new body to be welded has reached the new working position.

As can be seen from the above description, the welding station according to the invention enables four different types of body to be operated on and at the same time occupies a very limited space longitudinally of the installation. Obviously, when the number of models to be operated on is other than four, rotary drums 6 with a corresponding number of faces are provided.

Naturally, the principle of the invention remaining the same, the forms of embodiment and details of construction may be varied widely with respect to those described and illustrated purely by way of non-limiting example.

What is claimed is:

1. Apparatus for welding motor vehicle bodies which have previously been assembled loosely, comprising:
   a station for the forming and welding of the body, said station defining a working position;
   a conveyor line for transporting the loosely preassembled bodies through the said station;
   at least two pairs of forming frames situated at the two sides of the station, each pair of forming frames being provided with positioning devices engageable with the body and adapted to the specific geometric shape of a particular type of body;
   forming-frame conveyor means for bringing a pair of forming frames corresponding to the type of body to be welded into correspondence with the working position in the said station from time to time, and
   at least one welding device for effecting the welding of the body in the said station,
   wherein at least one drum member rotatable about an axis parallel to the length of the body in the said station is provided on each side of the conveyor line and carries on its periphery a plurality of said forming frames suitable for different types of body.

2. Apparatus according to claim 1, wherein the two drum members are situated at the two sides of the working position, and wherein means are provided for taking a forming frame from each drum member and moving it transversely to an operative position adjacent the body to be welded and vice versa to return the forming frame from the operative position to the drum member.

3. Apparatus according to claim 1, wherein each forming frame carries a plurality of electrical welding guns and terminal contacts to which the electrodes of the welding guns are connected, and wherein fixed electrical supply means for the welding guns are provided in correspondence with the working position of the said station and include a pair of clamp contacts which can engage the terminal contacts carried by the forming frame.

4. Apparatus according to claim 1, wherein each rotary frame has a polygonal cross-section and carries a forming frame on each of its faces.

5. A device according to claim 2, wherein the ends of each forming frame define lateral holes, and wherein the means for moving the forming frame transversely between the rotary drum and the operative positive comprise a portal structure which is guided transversely on the fixed structure of the said station and has lateral legs provided with coupling pins which are adapted to engage said lateral holes in the ends of the forming frames.

6. Apparatus according to claim 1, wherein each forming frame has, on its face which faces the respective rotary drum, a plurality of coupling pins defining respective through-holes and the respective drum defines a plurality of corresponding holes in which said coupling pins are intended to be housed and locked, transverse wedges engageable in the through-holes in the coupling pins being provided to lock the said pins in the corresponding holes.

7. Apparatus according to claim 1, wherein a plurality of cartesian robots carrying welding guns are supported at the top of the fixed structure of the forming and welding station.

8. Apparatus according to claim 5, wherein it includes means for clamping each forming frame in the operative position in order to ensure the correct positioning of the frame.

* * * * *